United States Patent
Kanamori

(10) Patent No.: US 10,197,722 B2
(45) Date of Patent: Feb. 5, 2019

(54) FLEXIBLE LINEAR LIGHT EMITTING ELEMENT AND A METHOD OF PRODUCING THE SAME

(71) Applicant: FUKUVI CHEMICAL INDUSTRY CO., LTD., Fukui-shi, Fukui (JP)

(72) Inventor: Naoaki Kanamori, Fukui (JP)

(73) Assignee: FUKUVI CHEMICAL INDUSTRY CO., LTD., Fukui (JP)

( * ) Notice: Subject to any disclaimer, the term of this patent is extended or adjusted under 35 U.S.C. 154(b) by 0 days.

(21) Appl. No.: 15/748,151

(22) PCT Filed: Aug. 23, 2016

(86) PCT No.: PCT/JP2016/003828
§ 371 (c)(1),
(2) Date: Jan. 26, 2018

(87) PCT Pub. No.: WO2017/038047
PCT Pub. Date: Mar. 9, 2017

(65) Prior Publication Data
US 2018/0231711 A1 Aug. 16, 2018

(30) Foreign Application Priority Data
Sep. 2, 2015 (JP) .................................. 2015-172544

(51) Int. Cl.
*G02B 6/02* (2006.01)
*F21V 8/00* (2006.01)
*G02B 6/44* (2006.01)
*G02B 6/00* (2006.01)

(52) U.S. Cl.
CPC ........... *G02B 6/02033* (2013.01); *G02B 6/00* (2013.01); *G02B 6/001* (2013.01); *G02B 6/02* (2013.01); *G02B 6/4479* (2013.01)

(58) Field of Classification Search
None
See application file for complete search history.

(56) References Cited

U.S. PATENT DOCUMENTS 6,519,401 B1  2/2003 Imamura et al.

FOREIGN PATENT DOCUMENTS

| JP | H06-230226 A | 8/1994 | |
| JP | 2000-131530 A | 5/2000 | |
| JP | 2009-276651 A | 11/2009 | |
| JP | 2012-514212 A | 6/2012 | |
| JP | 2013-57924 A | 3/2013 | |
| JP | 2015-028645 A | 2/2015 | |
| WO | WO20090054553 A2 * | 4/2009 | ............... G02B 1/04 |
| WO | 2013/151131 A1 | 10/2013 | |

OTHER PUBLICATIONS

Oct. 18, 2016 International Search Report issued in International Patent Application No. PCT/JP2016/003828.

* cited by examiner

*Primary Examiner* — Jerry Rahll
(74) *Attorney, Agent, or Firm* — Oliff PLC

(57) ABSTRACT

A flexible linear light emitting element to be flexibly bent along the shape of an object to be decorated or to be bent in accordance with a linearly represented decorative letter or decorative pattern of any kind and to excel in light emitting performance such as luminance as well as a method of producing the same. The optical fiber type linear light emitting element includes a bar-shaped extrusion-molded article in which a clad layer made from a fluorine resin is integrally formed over the periphery of a cored layer made from an acrylic thermoplastic elastomer; and a block copolymer of methyl methacrylate and butyl acrylate or a block copolymer of methyl acrylate and butyl acrylate, the flexural modulus of elasticity (according to ASTM D790) of the copolymers ranging from 50 to 500 MPa, is adopted for the material of the cored layer.

18 Claims, 2 Drawing Sheets

FLEXIBLE LINEAR LIGHT EMITTING ELEMENT AND A METHOD OF PRODUCING THE SAME

TECHNICAL FIELD

The present invention relates to improvement on a linear light emitting element, in detail, pertaining to a flexible linear light emitting element which is flexibly bent along the shape of an object to be decorated or bent in accordance with a linearly represented decorative letter and pattern and is excellent in light emitting performance such as luminance.

PRIOR ART

In recent years, a linear light emitting element has been used for a number of optical ornaments such as ornamental fittings or illuminations and decorative signs, in which the neon lamps having been used in the form of a linear light emitting element since before is made of a glass tube poor at flexibility, so that there is no bending the same along the curved portion of a wall or drawing a decorative letter or pattern with the same In view of the above, such optical fiber type linear light emitting elements molded from plastics are disclosed in Documents 1 and 2 below as allowing the same to be readily bent when necessary. The present applicant has also applied for patent claiming a linear light emitting element comprising a cored layer made from a transparent resin and a clad layer made from a semi-transparent resin (refer to Document 3 below).

However, as with the prior optical fiber type linear light emitting elements, because a transparent resin (mainly an inflexible acrylic resin) higher in flexural modulus of elasticity is adopted for the material of the cored layer, it makes a linear light emitting element in which the cored layer is integrated with the clad layer so rigid that there is no bending the same to a large extent, though there is no problem with bending the same to some extent. Therefore, the application is limited in scope.

In addition, with the prior optical fiber type linear light emitting elements, because a transparent resin higher in light transmittance is adopted for the material of the cored layer, sufficient light scattering effect is not brought within the cored layer when light is entered into the element from the light source, so that there is a problem with which the luminance of the light emitting element is minimized. Thus, with the prior linear light emitting element, such a contrivance is must as providing the same with a light reflection layer to enhance the amount of luminescence.

CITATION

Patent Literature

Document 1: Japanese Patent Unexamined Application Publication No. 2000-131530
Document 2: Japanese Patent Unexamined Application Publication No. 2009-276651
Document 3: Japanese Patent Unexamined Application Publication No. 2013-57924

SUMMARY OF THE INVENTION

Technical Problem

In view of the foregoing, the present invention is to provide a flexible linear light emitting element to be flexibly bent along the shape of an object to be decorated or to be bent in accordance with a linearly represented decorative letter or decorative pattern of any kind and to excel in light emitting performance such as luminance as well as to provide a method of producing the same.

Solution to Problem

The means adopted by the present inventors to solve the above technical problem is explained as follows with reference to the accompanying drawings.

The present optical fiber type linear light emitting element is characterized in that it comprises a bar-shaped extrusion-molded article in which a clad layer made from a fluorine resin is integrally formed over the periphery of a cored layer made from an acrylic thermoplastic elastomer; and a block copolymer of methyl methacrylate and butyl acrylate or a block copolymer of methyl acrylate and butyl acrylate, the flexural modulus of elasticity (according to ASTM D790) of the copolymers ranging from 50 to 500 MPa, is adopted for the material of the cored layer.

Further, considering that the cored layer and the clad layer are integrated with each other through co-extrusion molding, it is preferred that the cored layer be made from an acrylic thermoplastic elastomer whose MFR under the test conditions of 190 degrees Centigrade in temperature and 5 kg in load ranges from 2 to 10 g/10 min and the clad layer be made from a fluorine resin whose melting point is 230 degrees Centigrade or lower.

Moreover, regarding the material of the cored layer, especially in the balanced aspect between flexibility and light emitting performance thereof, it is preferred that a block copolymer of methyl methacrylate and butyl acrylate be adopted for the same.

Furthermore, in order to restrain luminescent color from being yellowed and improve on light emitting performance, it is preferred that 0.01 to 5 parts by weight of a white pigment be added to the clad layer against 100 parts by weight of the material from which the clad layer is made provided that the thickness of the clad layer ranges from 0.1 to 1 mm.

Further, in the aspect of light emitting performance, it is preferred that the clad layer comprise multiple layers and a while pigment be added to the outermost layer thereof.

On the other hand, for producing a linear light emitting element comprising a cored layer made from an acrylic thermoplastic elastomer and a clad layer made from a fluorine resin, such a method is adopted as the cored layer and the clad layer being integrated with each other through co-extrusion molding with a block copolymer of methyl methacrylate and butyl acrylate or a block copolymer of methyl acrylate and butyl acrylate, the flexural modulus of elasticity (according to ASTM D790) of the copolymers ranging from 50 to 500 MPa, adopted for the material of the cored layer.

Further, at the time of producing a linear light emitting element, it is preferred that co-extrusion molding be performed under a molding temperature of 270 degrees Centigrade or lower with an acrylic thermoplastic elastomer whose MFR ranges from 2 to 10 g/10 min under the test conditions of 190 degrees Centigrade in temperature and 5 kg in load adopted for the material of the cored layer and a fluorine resin whose melting point is 230 degrees or lower adopted for the material of the clad layer.

Advantageous Effects

According to the present optical fiber type linear light emitting element in which an acrylic thermoplastic elastomer smaller in flexural modulus of elasticity is adopted for the material of the cored layer, it makes the same so flexible that it can be bent to a large extent so as to be fixed on an object to be decorated or formed into a decorative letter or pattern. Thus, the present linear light emitting element can cover the applications in which the prior linear light emitting element has been infeasible.

Further, according to the present optical fiber type linear light emitting element in which a block copolymer of methyl methacrylate and butyl acrylate or a block copolymer of methyl acrylate and butyl acrylate is adopted for the acrylic thermoplastic elastomer from which the cored layer is made, it enhances light scattering effect within the cored layer so as to improve on the luminance of the element. It is considered that this advantageous effect is brought by the butyl acrylate substance dispersed in the elastomer.

According to the present optical fiber type linear light emitting element, not only the problem with flexibility on the prior counterpart can be solved, but also a flexible linear light emitting element whose light emitting performance is largely improved with the aid of the chemical action inherent in the acrylic thermoplastic elastomer from which the cored layer is made can be provided, so that its industrial applicability for practical use is to be highly evaluated.

BEST MODE FOR CARRYING OUT THE INVENTION

Hereafter, the preferred mode for carrying out the invention and the preferred conditions under which it is carried out are explained.

(Basic Arrangement of Flexible Linear Light Emitting Element)

Figure 1:
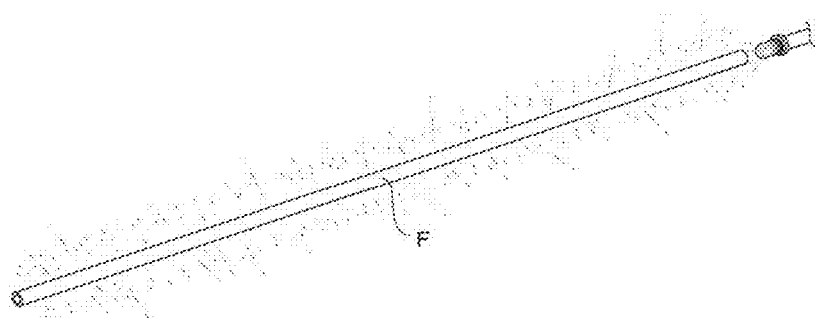
FIG. 1 is a whole perspective view of a flexible linear light emitting element according to the present invention.

The arrangement of the present flexible linear light emitting element is explained as follows. In the first place, the flexible linear light emitting element F illustrated in FIG. 1, from which side surface light is emitted, comprises a bar-shaped extrusion-molded article in which a clad layer is integrally formed over the periphery of a cored layer. Further, an acrylic thermoplastic elastomer whose flexural modulus of elasticity (according to ASTM D790) ranges from 50 to 500 MPa is adopted for the material of the cored layer while a fluorine resin is adopted for the material of the clad layer. Then, for the clad layer, not only that comprising one layer, but also that comprising multiple layers is adoptable.

(Material of Cored Layer)

A block copolymer of methyl methacrylate and butyl acrylate or a block copolymer of methyl acrylate and butyl acrylate, the flexural modulus of elasticity (according to ASTM D790) of the copolymers ranging from 50 to 500 MPa, is adoptable for the acrylic thermoplastic elastomer from which the cored layer is made, in which it is preferred to use a block copolymer of methyl methacrylate and butyl acrylate (hereinafter, referred to as MMA-BA block copolymer) for the same. In this regard, it is preferred that the acrylic thermoplastic elastomer whose MFR ranges from 2 to 10 g/10 min under the test conditions of 190 degrees Centigrade in temperature and 5 kg in load be adopted for the material of the cored layer, taken into account co-extrusion molding with the clad layer.

(Material of Clad Layer)

As for a fluorine resin from which the clad layer is made, as far as its refractive index is smaller than that of the cored layer, it is selectable from ETFE (a copolymer of ethylene and tetrafluoroethylene), EFEP (a copolymer of hexafluoropropylene, tetrafluoroethylene and ethylene) and PVDF (polyvinylidene difluoride), by way of some examples. Taken into account co-extrusion molding with the cored layer, it is preferred that a fluorine resin whose melting point is 230 degrees Centigrade or lower be adopted for the material of the clad layer.

In this regard, when PVDF is adopted for the material of the clad layer, it is so high in compatibility with the acrylic thermoplastic elastomer from which the cored layer is made that it is advantageous in that the peeling of the clad layer from the cored layer is hard to occur. On the other hand, when ETFE is adopted for the material of the clad layer, due to the fact that the elongation (350 to 450%) of ETFE is larger than that (200 to 300%) of PVDF and the flexural modulus of elasticity (800 to 1000 MPa) of ETFE is smaller than that (1400 to 1800 MPa) of PVDF, winkles are hard to occur on the clad layer when the linear light emitting element is bent. Further, ETFE is higher in visible light transmission than PVDF, so that the attenuation rate of luminance can be minimized. The above values of elongation are those measured according to ASTM D638 while the above values of flexural modulus of elasticity are those measured according to ASTM D790.

(Compounding of Colorant into Clad Layer or Cored Layer)

A colorant can be compounded into the material of the clad layer where appropriate in order to color the emitted light or to restrain the luminescent color from being yellowed or to improve on light emitting performance. It is preferred to adopt titanium dioxide which is a white pigment and excels in light scattering effect for such colorant, but instead barium nitrate may be adopted for such white pigment. In this regard, it is preferred that 0.01 to 5 parts by weight of a white pigment be compounded against 100 parts by weight of the material of the clad layer provided that the thickness of the clad layer is defined as 0.1 to 1 mm. To note, when the clad layer comprises two or more layers, it is preferred that such colorant be compounded into the outermost layer thereof. Where necessary, such colorant may be compounded into the material of the cored layer as well.

(Production Method of Flexible Linear Light Emitting Element)

Figure 2:
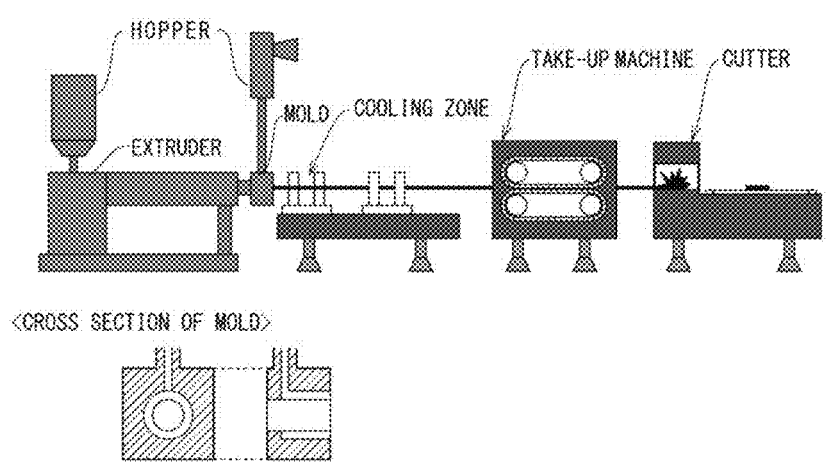
FIG. 2 is an explanatory view showing the production steps of a flexible linear light emitting element according to the present invention.

Then, the production method of the present flexible linear light emitting element is explained. In the first place, as illustrated in FIG. 2, a bar-shaped cored layer and a tubular clad layer are simultaneously extruded from a mold of an extruder; an extrudate in which the cored layer and the clad layer are integrated with each other is subjected to cooling and shaping; and the cooled and shaped extrudate is cut into the prescribed length so as to be produced into flexible linear light emitting elements. At the time of producing the same, it is preferred that an acrylic thermoplastic elastomer whose MFR ranges from 2 to 10 g/10 min under the test conditions of 190 degrees Centigrade in temperature and 5 kg in load be adopted for the cored layer while a fluorine resin whose melting point is 230 degrees Centigrade or lower be adopted for the clad layer; and those layers be subjected to co-extrusion molding under the molding temperature at 270 degrees Centigrade or lower.

EXAMPLES

Verification Test of Advantageous Effect

The verification test of the present advantageous effects is explained as follows. In the first place, multiple samples which are different in production conditions from one another (a material of the cored layer and the clad layer respectively, a thickness of the clad layer, compounding a colorant into the clad layer or not) are prepared; and evaluations on flexibility, light emitting performance (luminance and attenuation rate), appearance and the anti-peeling property of the clad layer against the cored layer are made for the respective samples. The production conditions of the respective samples according to comparison examples 1 and 2 as well as the first to tenth examples are summarized as follows.

Comparison Example 1

In this example, a linear light emitting element is produced through co-extrusion molding by adopting PMMA (manufactured by Sumitomo Chemical Co., Ltd. under the product name of SUMIPEX MG5) whose MFR under the test conditions of 230 degrees Centigrade in temperature and 2.16 kg in load is 5 g/10 min and whose textural modulus of elasticity is 3100 MPa for the material of the cored layer; and adopting ETFE (manufactured by Asahi Glass Co., Ltd. under the trade name of C-88AXP) whose melting point, elongation, flexural modulus of elasticity and MFR under the test conditions of 297 degrees Centigrade in temperature and 5 kg in load are 260 degrees Centigrade, 415%, 890 MPa and 12 g/10 min respectively for the material of the clad layer, in which the thickness of the clad layer is defined as 0.26 mm.

Comparison Example 2

In this example, the clad layer comprises two layers or inner and outer layers. A linear light emitting element is produced through co-extrusion molding by adopting PMMA (manufactured by Sumitomo Chemical Co., Ltd. under the product name of SUMIPEX MG5) whose MFR under the test conditions of 230 degrees Centigrade in temperature and 2.16 kg in load is 5 g/10 min and whose textural modulus of elasticity is 3100 MPa for the material of the cored layer; and adopting ETFE (manufactured by Asahi Glass Co., Ltd. under the trade name of C-88AXP) whose melting point, elongation, flexural modulus of elasticity and MFR under the test conditions of 297 degrees Centigrade in temperature and 5 kg in load are 260 degrees Centigrade, 415%, 890 MPa and 12 g/10 min respectively for the material of the clad layer. As for the thickness of the respective clad layers, that of the inner one is defined as 0.1 mm while that of the outer one is defined as 0.11 mm, in which 1.3 parts by weight of a colorant made from titanium dioxide is added to the outer layer thereof against 100 parts by weight of the material from which the clad layer is made.

First Example

In this example, a linear light emitting element is produced through co-extrusion molding by adopting MMA-BA block copolymer whose MFR under the test conditions of 190 degrees Centigrade in temperature and 2.16 kg in load is 3.1 g/10 min and whose flexural modulus of elasticity is 400 MPa for the material of the cored layer; and adopting ETFE whose melting point, elongation, flexural modulus of elasticity and MFR under the test conditions of 297 degrees Centigrade in temperature and 5 kg in load are 226 degrees Centigrade, 430%, 810 MPa and 26.4 g/10 min respectively for the clad layer. The thickness of the clad layer is defined as 0.24 mm, in which 0.065 parts by weight of titanium dioxide acting as a colorant is added against 100 parts by weight of the material of the clad layer.

Second Example

In this example, a linear light emitting element is produced through co-extrusion molding by adopting MMA-BA block copolymer whose MFR under the test conditions of 190 degrees Centigrade in temperature and 2.16 kg in load and whose flexural modulus of elasticity is 440 MPA for the material of the cored layer; and adopting ETFE whose melting point, elongation, flexural modulus of elasticity and MFR under the test conditions of 297 degrees Centigrade in temperature and 5 kg in load are 226 degrees Centigrade, 430%, 810 MPa and 26.4 g/10 min respectively for the clad layer. The thickness of the clad layer is defined as 0.27 mm, in which 0.065 parts by weight of titanium dioxide acting as a colorant is added against 100 parts by weight of the material of the clad layer.

Third Example

In this example, a linear light emitting element is produced through co-extrusion molding by adopting MMA-BA block copolymer whose MFR under the test conditions of 190 degrees Centigrade in temperature and 2.16 kg in load is 10 g/10 min and whose flexural modulus of elasticity is 70 MPA for the material of the cored layer; and adopting ETFE whose melting point, elongation, flexural modulus of elasticity and MFR under the test conditions of 297 degrees Centigrade in temperature and 5 kg in load are 192 degrees Centigrade, 417%, 959 MPa and 78.6 g/10 min respectively for the clad layer. The thickness of the clad layer is defined as 0.27 mm.

Fourth Example

In this example, a linear light emitting element is produced through co-extrusion molding by adopting MMA-BA block copolymer (manufactured by Kuraray Co., Ltd. under the product name of KURARITY LA4285) whose MFR under the test conditions of 190 degrees Centigrade in temperature and 2.16 kg in load is 1.5 g/10 min and whose flexural modulus of elasticity is 650 MPA for the cored layer; and adopting PVDF (manufactured by Kureha Corporation under the trade name of KF PolymerT#1000) whose melting point, elongation, flexural modulus of elasticity and MFR under the test conditions of 230 degrees Centigrade in temperature and 5 kg in load are 173 degrees Centigrade, 200%, 1570 MPA and 78.6 g/10 min respectively for the clad layer. The thickness of the clad layer is defined as 0.27 mm.

Fifth Example

In this example, a linear light emitting element is produced through co-extrusion molding by adopting MMA-BA block copolymer whose MFR under the test conditions of 190 degrees Centigrade in temperature and 2.16 kg in load is 3.1 g/10 min and whose flexural modulus of elasticity is 400 MPa for the cored layer; and adopting ETFE whose melting point, elongation, flexural modulus of elasticity and MFR under the test conditions of 230 degrees Centigrade in temperature and 5 kg in load are 226 degrees Centigrade, 430%, 810 MPa and 26.4 g/10 min respectively for the clad layer. The thickness of the clad layer is defined as 0.27 mm.

Sixth Example

In this example, a linear light emitting element is produced through co-extrusion molding by adopting MMA-BA block copolymer whose MFR under the test conditions of 190 degrees Centigrade in temperature and 2.16 kg in load is 3.1 g/10 min and whose flexural modulus of elasticity is 400 MPa for the cored layer; and adopting ETFE whose melting point, elongation, flexural modulus of elasticity and MFR under the test conditions of 230 degrees Centigrade in temperature and 5 kg in load are 226 degrees Centigrade, 430%, 810 MPa and 26.4 g/10 min respectively for the clad layer. The thickness of the clad layer is defined as 0.19 mm.

Seventh Example

In this example, a linear light emitting element is produced through co-extrusion molding by adopting MMA-BA block copolymer whose MFR under the test conditions of 190 degrees Centigrade in temperature and 2.16 kg in load is 3.1 g/10 min and whose flexural modulus of elasticity is 400 MPa for the cored layer; and adopting ETFE whose melting point, elongation, flexural modulus of elasticity and MFR under the test conditions of 230 degrees Centigrade in temperature and 5 kg in load are 226 degrees Centigrade, 430%, 810 MPa and 26.4 g/10 min respectively for the clad layer. The thickness of the clad layer is defined as 0.39 mm.

Eighth Example

In this example, a linear light emitting element is produced through co-extrusion molding by adopting MMA-BA block copolymer whose MFR under the test conditions of 190 degrees Centigrade in temperature and 2.16 kg in load is 3.1 g/10 min and whose flexural modulus of elasticity is 400 MPa for the material of the cored layer; and adopting ETFE whose melting point, elongation, flexural modulus of elasticity and MFR under the test conditions of 297 degrees Centigrade in temperature and 5 kg in load are 192 degrees Centigrade, 417%, 959 MPa and 78.6 g/10 min respectively for the material of the clad layer. The thickness of the clad layer is defined as 0.21 mm, in which 1.3 parts by weight of titanium dioxide acting as a colorant is added to the clad layer against 100 parts by weight of the material of the clad layer.

Ninth Example

In this example, the clad layer comprises two layers or inner and outer layers. A linear light emitting element is produced through co-extrusion molding by adopting MMA-BA block copolymer whose MFR under the test conditions of 190 degrees Centigrade in temperature and 2.16 kg in load is 3.1 g/10 min and whose flexural modulus of elasticity is 400 MPa for the material of the cored layer; and adopting ETFE whose melting point, elongation, flexural modulus of elasticity and MFR under the test conditions of 297 degrees Centigrade in temperature and 5 kg in load are 192 degrees Centigrade, 417%, 959 MPa and 78.6 g/10 min respectively for the material of the inner and outer layers respectively. The thickness of the inner layer is defined as 0.1 mm while that of the outer layer is defined as 0.11 mm, in the outer layer 1.3 parts by weight of titanium dioxide acting as a colorant being added against 100 parts by weight of the material of the clad layer.

Tenth Example

In this example, the clad layer comprises two layers or inner and outer layers. A linear light emitting element is produced through co-extrusion molding by adopting MMA-BA block copolymer whose MFR under the test conditions of 190 degrees Centigrade in temperature and 2.16 kg in load is 3.1 g/10 min and whose flexural modulus of elasticity is 400 MPa for the material of the cored layer; and adopting ETFE whose melting point, elongation, flexural modulus of elasticity and MFR under the test conditions of 297 degrees Centigrade in temperature and 5 kg in load is 26.4 g/10 min for the material of the inner and outer layers respectively. The thickness of the inner layer is defined as 0.1 mm while that of the outer layer is defined as 0.11 mm, in the outer layer 1.3 parts by weight of titanium dioxide acting as a colorant being added against 100 parts by weight of the material of the clad layer.

(Evaluation of Flexibility)

Then, as the result of measuring the bending radius (permissible bending radius) of each sample having 3 mm in diameter according to the comparison example 1 and the first to eighth examples in which the clad layer comprises the single layer, it is found that the bending radius of each sample according to the first to eighth examples is R100 or smaller against that of the sample according to the comparison example 1 or R200, so that the linear light emitting elements according to the first to eighth examples are more excellent in flexibility than the counterpart according to the comparison example 1. The following table summarizes the production conditions and the measured result of the bending radius of each sample according to the comparison example 1 and the first to eighth examples.

TABLE 1

| | | | Ex. 1 | Ex. 2 | Ex. 3 | Ex. 4 | Ex. 5 | Ex. 6 | Ex. 7 | Ex. 8 | Com. Ex. 1 |
|---|---|---|---|---|---|---|---|---|---|---|---|
| Core | Material | | MMA-BA Block Copolymer | | | | | | | | PMMA |
| | MFR (190° C. or 230° C./2.16 kg) | [g/10 min] | 3.1 (190° C.) | 2.2 (190° C.) | 10 (190° C.) | 15 (190° C.) | | 3.1 (190° C.) | | | 5 (230° C.) |
| | Flexural Modulus of Elasticity | [MPa] | 400 | 440 | 70 | 650 | | 400 | | | 3100 |
| Clad | Material | | ETFE | | PVDF | | ETFE | | | | ETFE |
| | Melting Point | [° C.] | | 226 | 192 | 173 | 226 | | | 192 | 260 |

TABLE 1-continued

| | | | Ex. 1 | Ex. 2 | Ex. 3 | Ex. 4 | Ex. 5 | Ex. 6 | Ex. 7 | Ex. 8 | Com. Ex. 1 |
|---|---|---|---|---|---|---|---|---|---|---|---|
| | Elongation | [%] | 430 | 417 | 200 | | 430 | 417 | | | 415 |
| | Flexural Modulus of Elasticity | [MPa] | 810 | 959 | 1570 | | 810 | 959 | | | 890 |
| | MFR (297° C. or 230° C./5 kg) | [g/10 min] | 26.4 (297° C.) | 78.6 (297° C.) | 6 (230° C.) | | 26.4 (297° C.) | 78.6 (297° C.) | | | 12 (297° C.) |
| | Thickness | [mm] | 0.24 | | | 0.27 | | 0.19 | 0.39 | 0.21 | 0.26 |
| | Material of Colorant | | | | | TiO$_2$ | | | | | TiO$_2$ |
| | Compounded Amount of Colorant | Parts by Weight | 0.065 | | | n/a | | n/a | | 1.3 | n/a |
| Core & Clad | Bending Radius (φ3 mm) | | R40 | R40 | R10 | R60 | R100 | | | R40 | R200 |

Further, as the result of measuring the bending radius (permissible bending radius) of each sample having 3 mm in diameter according to the comparison example 2 and the ninth and tenth examples, it is found that the bending radius of each sample according to the ninth and tenth examples is R100 or smaller against that of the sample according to the comparison example 2 or R250, so that the linear light emitting elements according to the ninth and tenth examples are more excellent in flexibility than the counterpart according to the comparison example 2. The following table summarizes the production conditions and the measured result of the bending radius of each sample according to the comparison example 2 and the ninth and tenth examples.

TABLE 2

| | | | Ex. 9 | Ex. 10 | Com. Ex. 2 |
|---|---|---|---|---|---|
| Core | Material | | MMA-BA Block Copolymer | | PMMA |
| | MFR (190° C. or 230° C./2.16 kg) | [g/10 min] | 3.1 (190° C.) | | 5 (230° C.) |
| | Flexural Modulus of Elasticity | [MPa] | 400 | | 3100 |
| Clad (inner) | Material | | ETFE | | ETFE |
| | Melting Point | [° C.] | 192 | 226 | 260 |
| | Elongation | [%] | 417 | 430 | 415 |
| | Flexural Modulus of Elasticity | [MPa] | 959 | 810 | 890 |
| | MFR (297° C. or 230° C./5 kg) | [g/10 min] | 78.6 (297° C.) | 26.4 (297° C.) | 12 (297° C.) |
| | Thickness | [mm] | 0.1 | | 0.1 |
| Clad (outer) | Material | | ETFE | | ETFE |
| | Melting Point | [° C.] | 192 | 226 | 260 |
| | Elongation | [%] | 417 | 430 | 415 |
| | Flexural Modulus of Elasticity | [MPa] | 959 | 810 | 890 |
| | MFR (297° C. or 230° C./5 kg) | [g/10 min] | 78.6 (297° C.) | 26.4 (297° C.) | 12 (297° C.) |
| | Thickness | [mm] | 0.11 | | 0.11 |
| | Material of Colorant | | TiO$_2$ | | TiO$_2$ |
| | Compounded Amount of Colorant | Parts by Weight | 1.3 | | 1.3 |
| Core & Clad | Bending Radius (φ3 mm) | | R50 | R55 | R250 |

(Evaluation of Light Emitting Performance)

Then, as for each sample of the comparison examples 1 and 2 as well as the first to tenth examples, the luminance of each sample having 1000 mm in length and 6.3 mm in diameter is measured every 100 mm at the distances from the light source ranging from 100 to 900 mm. To note, the present evaluation is made in such a manner that a spectral radiance meter (manufactured by Konica Minolta, Inc. under the product name of CS-2000) is disposed at a location distant away by 600 mm in the vertical direction from a portion of each sample to be measured. The specification of the light source in use is as follows: driving current at 300 mA; 37.7 cd/m$^2$ in luminance; 135 lm of luminous flux; and directivity at 120 degrees. The measuring conditions are summarized in the following Table 3.

TABLE 3

| Measuring Device | Spectral Radiance Meter CS-2000 (manufactured by Konica Minolta, Inc.) | | | |
|---|---|---|---|---|
| Specification of Light Source | Driving Current | 300 mA | Luminance | 37.7 cd/m$^2$ |
| | Luminous Flux | 135 lm | Directivity | 120 degrees |

TABLE 3-continued

| | |
|---|---|
| Sample Length | 1000 mm |
| Sample Diameter | Ø6.3 mm |
| Distance from Sample | 600 mm |
| Measuring Range | 100 to 900 mm |

Figure 3:
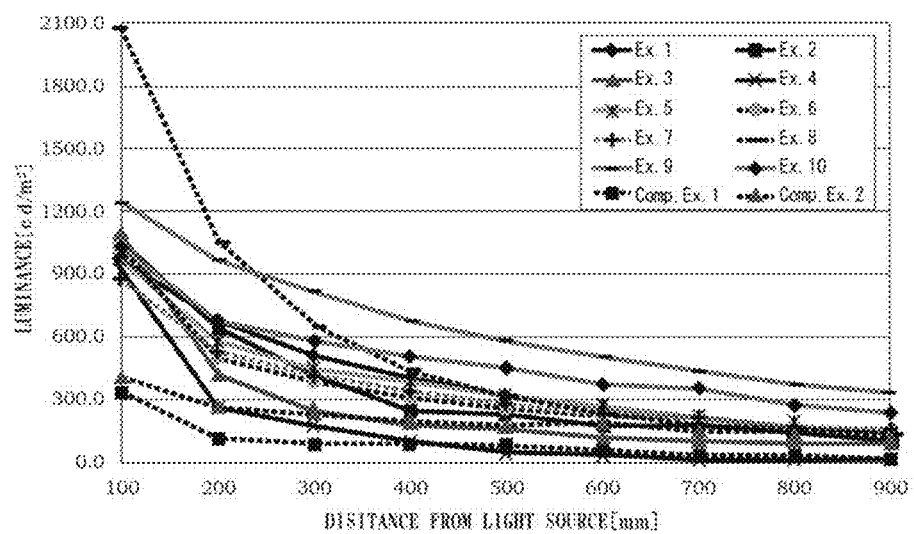
FIG. 3 is a graph showing the luminance test result of a flexible linear light emitting element according to the present invention.

Then, as seen from FIG. 3 in which the measuring results are represented with a graph, it is confirmed that the overall luminance of each sample according to the first to tenth examples is larger than that of each sample according to the comparison examples 1 and 2 (in which the sample according to the ninth example is far excellent in luminance and uniformity of light emitting performance). Further, as the result of calculating an attenuation rate of each sample based on the corresponding luminance, it is confirmed that an attenuation rate of each sample according to the first to third examples as well as that of each sample according to the fifth to eighth samples in which ETFE is adopted for the material of the clad layer range from 1.05 to 1.14%/cm, so that they are controlled lower than that of the sample according to the fourth example in which PVDF is adopted for the material of the clad layer. The detailed data on the luminance and attenuation rate of each sample are summarized in the following.

TABLE 4

| | | | Distance from Light Source [mm] | | | | |
|---|---|---|---|---|---|---|---|
| | Core | Clad | 100 | 200 | 300 | 400 | 500 |
| Luminance [cd/m$^2$] | Ex. 1 | ETFE | 975.1 | 674.4 | 512.3 | 397.7 | 319.7 |
| | Ex. 2 | | 1050.9 | 649.7 | 417.6 | 251.6 | 218.4 |
| | Ex. 3 | | 1087.2 | 415.7 | 252.5 | 192.3 | 154.1 |
| | Ex. 4 | PVDF | 968.7 | 261.3 | 183.8 | 106.9 | 54.5 |
| | Ex. 5 | ETFE | 986.3 | 578.8 | 450.7 | 381.2 | 313.9 |
| | Ex. 6 | | 1030.4 | 499.9 | 389.2 | 310.2 | 270.6 |
| | Ex. 7 | | 876.4 | 533.9 | 423.7 | 345.5 | 282.0 |
| | Ex. 8 | | 2070.8 | 1048.6 | 651.9 | 440.7 | 319.4 |
| | Ex. 9 | | 1239.4 | 969.8 | 817.2 | 675.4 | 580.7 |
| | Ex. 10 | | 1023.8 | 667.6 | 580.3 | 507.8 | 451.7 |
| | Comp. Ex. 1 | | 341.7 | 122.7 | 93.6 | 92.0 | 84.0 |
| | Comp/Ex. 2 | | 415.2 | 267.2 | 230.3 | 204.4 | 184.6 |

| | | | Distance from Light Source [mm] | | | | Attenuation Rate |
|---|---|---|---|---|---|---|---|
| | Core | Clad | 600 | 700 | 800 | 900 | [%/cm] |
| Luminance [cd/m$^2$] | Ex. 1 | ETFE | 265.7 | 214.4 | 173.2 | 147.8 | 1.1 |
| | Ex. 2 | | 176.8 | 137.1 | 112.7 | 105.7 | 1.1 |
| | Ex. 3 | | 130.3 | 115.8 | 99.5 | 93.3 | 1.1 |
| | Ex. 4 | PVDF | 37.2 | 16.8 | 9.7 | 1.3 | 1.2 |
| | Ex. 5 | ETFE | 274.8 | 221.5 | 187.2 | 144.5 | 1.1 |
| | Ex. 6 | | 229.6 | 204.4 | 173.1 | 155.0 | 1.1 |
| | Ex. 7 | | 234.6 | 193.7 | 167.0 | 142.9 | 1.0 |
| | Ex. 8 | | 238.3 | 185.2 | 144.9 | 116.8 | 1.2 |
| | Ex. 9 | | 503.8 | 436.6 | 373.0 | 335.0 | 0.9 |
| | Ex. 10 | | 375.2 | 350.6 | 274.9 | 234.9 | 1.0 |
| | Comp. Ex. 1 | | 64.8 | 38.9 | 36.9 | 21.2 | 1.2 |
| | Comp/Ex. 2 | | 189.5 | 152.9 | 153.6 | 113.3 | 0.9 |

(Evaluation of Appearance and Anti-Peeling Property)

Then, as the result of examining the appearance of each sample according to the first to seventh examples which is subjected to repeated bending, wrinkles are observed for the samples in which PVDF is adopted for the material of the clad layer whereas any wrinkles are not observed for those in which ETFE is adopted for the material of the clad layer, which means that the latter are excellent in appearance. Further, when the cut by means of cutlery such as cutters reaches the cored layer, the clad layer of the samples in which ETFE is adopted for the material of the clad layer is found peeled whereas that of those in which PVDF is adopted for the material of the clad layer is found free from peeling. The characteristic properties of ETFE and PVDF are summarized in the following Table 5.

TABLE 5

| | ETFE | PVDF |
|---|---|---|
| Wrinkle | none | some |
| Luminance | Good | Possible |

TABLE 5-continued

| | ETFE | PVDF |
|---|---|---|
| Anti-peeling Property | Possible | Good |

The invention claimed is:

1. A flexible linear light emitting element which is a bar-shaped extrusion-molded article with a clad layer essentially made from a fluorine resin integrally formed over a periphery of a cored layer made from an acrylic thermoplastic elastomer, wherein the cored layer is made from one of a block copolymer comprising methyl methacrylate and butyl acrylate and a block copolymer comprising methyl acrylate and butyl acrylate,
  wherein the block copolymer has a flexural modulus of elasticity ranging from 50 to 500 MPa.

2. The flexible linear light emitting element according to claim 1, wherein the cored layer is made from an acrylic thermoplastic elastomer whose MFR (Melt Flow Rate) ranges from 2 to 10 g/10 min under test conditions of 190 degrees Centigrade in temperature and 5 kg in load; and the clad layer is made from a fluorine resin whose melting point is 230 degrees centigrade or lower.

3. The flexible linear light emitting element according to claim 2, wherein the clad layer comprises multiple layers; and a white pigment is added to an outermost layer of the clad layer.

4. The flexible linear light emitting element according to claim 2, wherein the cored layer is made from the block copolymer comprising methyl methacrylate and butyl acrylate.

5. The flexible linear light emitting element according to claim 4, wherein a thickness of the clad layer ranges from 0.1 to 1 mm; and 0.01 to 5 parts by weight of a white pigment is added in the clad layer against 100 parts by weight of the fluorine resin.

6. The flexible linear light emitting element according to claim 5, wherein the clad layer comprises multiple layers; and the white pigment is added to an outermost layer of the clad layer.

7. The flexible linear light emitting element according to claim 4, wherein the clad layer comprises multiple layers; and a white pigment is added to an outermost layer of the clad layer.

8. The flexible linear light emitting element according to claim 2, wherein a thickness of the clad layer ranges from 0.1 to 1 mm; and 0.01 to 5 parts by weight of a white pigment is added in the clad layer against 100 parts by weight of the fluorine resin.

9. The flexible linear light emitting element according to claim 8, wherein the clad layer comprises multiple layers; and the white pigment is added to an outermost layer of the clad layer.

10. The flexible linear light emitting element according to claim 1, wherein a thickness of the clad layer ranges from 0.1 to 1 mm; and 0.01 to 5 parts by weight of a white pigment is added in the clad layer against 100 parts by weight of the fluorine resin.

11. The flexible linear light emitting element according to claim 10, wherein the clad layer comprises multiple layers; and the white pigment is added to an outermost layer of the clad layer.

12. The flexible linear light emitting element according to claim 1, wherein the cored layer is made from the block copolymer comprising methyl methacrylate and butyl acrylate.

13. The flexible linear light emitting element according to claim 12, wherein the clad layer comprises multiple layers; and a white pigment is added to an outermost layer of the clad layer.

14. The flexible linear light emitting element according to claim 12, wherein a thickness of the clad layer ranges from 0.1 to 1 mm; and 0.01 to 5 parts by weight of a white pigment is added in the clad layer against 100 parts by weight of the fluorine resin.

15. The flexible linear light emitting element according to claim 14, wherein the clad layer comprises multiple layers; and the white pigment is added to an outermost layer of the clad layer.

16. The flexible linear light emitting element according to claim 1, wherein the clad layer comprises multiple layers; and a white pigment is added to an outermost layer of the clad layer.

17. A method of producing a flexible linear light emitting element comprising a cored layer made from an acrylic thermoplastic elastomer and a clad layer made from a fluorine resin, wherein the cored layer and the clad layer are integrated with each other through co-extrusion molding with one of a block copolymer comprising methyl methacrylate and butyl acrylate and a block copolymer comprising methyl acrylate and butyl acrylate adopted for the cored layer, wherein the block copolymer has a flexural modulus of elasticity ranging from 50 to 500 MPa.

18. The method of producing a flexible linear light emitting element according to claim 17, wherein the co-extrusion molding is performed under a molding temperature of 270 degrees Centigrade or lower with the acrylic thermoplastic elastomer whose MFR ranges from 2 to 10 g/10 min under test conditions of 190 degrees Centigrade in temperature and 5 kg in load adopted for the cored layer while the fluorine resin whose melting point is 230 degrees Centigrade or lower adopted for the clad layer.

\* \* \* \* \*